(12) United States Patent
Na et al.

(10) Patent No.: US 10,730,464 B2
(45) Date of Patent: Aug. 4, 2020

(54) VEHICLE AND CONTROL METHOD THEREOF

(71) Applicants: Hyundai Motor Company, Seoul (KR); Kia Motors Corporation, Seoul (KR)

(72) Inventors: YoungIl Na, Hwaseong-si (KR); Wooyeol Jeong, Seoul (KR); Jungwan Park, Seoul (KR); Chiyoung An, Cheongju-si (KR); Donghyuk Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 144 days.

(21) Appl. No.: 15/903,922

(22) Filed: Feb. 23, 2018

(65) Prior Publication Data

US 2019/0135214 A1    May 9, 2019

(30) Foreign Application Priority Data

Nov. 8, 2017  (KR) .......................... 10-2017-0147695

(51) Int. Cl.
| | |
|---|---|
| *B60R 21/0134* | (2006.01) |
| *B60R 21/015* | (2006.01) |
| *E05F 15/72* | (2015.01) |
| *B60R 21/013* | (2006.01) |
| *B60R 21/01* | (2006.01) |

(52) U.S. Cl.
CPC .... *B60R 21/0134* (2013.01); *B60R 21/01544* (2014.10); *E05F 15/72* (2015.01);
(Continued)

(58) Field of Classification Search
CPC . E05B 77/12; B60R 21/0132; B60R 21/0134; B60R 21/01544;
(Continued)

(56) References Cited

U.S. PATENT DOCUMENTS

| | | | |
|---|---|---|---|
| 7,586,402 B2 * | 9/2009 | Bihler ................... | B60Q 9/008 340/435 |
| 7,734,416 B2 | 6/2010 | Yano et al. | |

(Continued)

FOREIGN PATENT DOCUMENTS

| | | |
|---|---|---|
| JP | 2006-007869 A | 1/2006 |
| JP | 2016-175521 A | 10/2016 |

(Continued)

*Primary Examiner* — Anthony R Jimenez
(74) *Attorney, Agent, or Firm* — Morgan, Lewis & Bockius LLP (57) ABSTRACT

A vehicle may include a vehicle detector configured to detect an obstacle and a condition of the inside and the outside of the vehicle; and a controller, when a front obstacle is detected by the vehicle detector, configured to determine a required braking distance or a time to collision (TTC) with respect to the obstacle, configured to determine whether a door side collision with the obstacle is estimated, when a collision with the obstacle is estimated according to the result of the determination, and configured to open a door in emergency or convert the door into a manual opening mode when the door side collision is estimated.

19 Claims, 8 Drawing Sheets

(52) U.S. Cl.
CPC ............ *B60R 2021/01013* (2013.01); *B60R 2021/01252* (2013.01); *B60R 2021/01311* (2013.01); *B60Y 2200/143* (2013.01); *E05Y 2800/40* (2013.01); *E05Y 2900/506* (2013.01); *E05Y 2900/531* (2013.01)

(58) Field of Classification Search
CPC .......... B60R 2021/01013; B60R 2021/01252; B60R 2021/01311; B60R 21/00; B60R 21/013; B60R 21/134; E05F 15/72; B60Y 2200/143; B60Y 2400/30; E05Y 2800/40; E05Y 2900/506; E05Y 2900/531; B62D 5/07; B62D 6/00
USPC ......................................................... 701/45
See application file for complete search history.

(56) References Cited

U.S. PATENT DOCUMENTS

| | | | |
|---|---|---|---|
| 7,844,384 B2 | 11/2010 | Seto | |
| 8,302,995 B2* | 11/2012 | Xu | B60R 21/0136 280/806 |
| 9,150,223 B2 | 10/2015 | Minemura et al. | |
| 9,387,819 B2* | 7/2016 | Furst | B60R 21/0132 |
| 10,112,609 B2* | 10/2018 | Mukai | B60W 30/09 |
| 2004/0059488 A1* | 3/2004 | Iida | B60R 21/013 701/49 |
| 2011/0137507 A1* | 6/2011 | Sinh | B60R 21/01 701/31.4 |

FOREIGN PATENT DOCUMENTS

| | | |
|---|---|---|
| KR | 10-1999-0026979 A | 4/1999 |
| KR | 10-0215277 B1 | 5/1999 |
| KR | 10-0249479 B1 | 5/2000 |
| KR | 10-2009-0039501 A | 4/2009 |
| KR | 10-1158564 B1 | 6/2012 |
| KR | 10-2012-0140545 A | 12/2012 |
| KR | 10-1389963 B1 | 4/2014 |
| KR | 10-2016-0062420 A | 6/2016 |
| KR | 10-1717080 B1 | 3/2017 |

* cited by examiner

(a) DOOR SIDE COLLISION ESTIMATION (b) AUTOMATIC DOOR OPENING (c) COLLISION OCCURRENCE (d) PASSENGER EVACUATION

VEHICLE AND CONTROL METHOD THEREOF

CROSS-REFERENCE TO RELATED APPLICATION(S)

The present application claims priority to Korean Patent Application No. 10-2017-0147695, filed on Nov. 8, 2017, the entire contents of which is incorporated herein for all purposes by this reference.

BACKGROUND OF THE INVENTION

Field of the Invention

The present invention relates to a vehicle and a control method thereof.

Description of Related Art

A variety of vehicle safety devices have been developed and mounted to a vehicle in consideration with the driver's convenience and safety.

The vehicle safety device may include a safety auxiliary device including a lane departure warning system configured to prevent a vehicle from being departure from a driving lane by helping the steering wheel operation of the driver when the vehicle is driven on the road, and an additional service device such as a navigation system configured to guide a route to a destination, and information related to around the route to the destination and the destination which is selected by a driver.

The above-described safety device may further include an advanced emergency braking system (AEBS) that alleviates an impact when a collision with a front vehicle is inevitable.

In a state in which a tourist bus is not provided with a middle door, when a collision accident occurs, a door structure may be damaged and thus the door may not be opened although a door mode is converted into a manual mode. Although the bus is provided with a hammer to remove a window glass for escaping in the emergency, there may be a case in which the hammer is lost due to the improper maintenance or a case in which a passenger in panic cannot remove the window glass by use of the hammer. Furthermore, although the window glass is removed, there may be an additional risk such that the passenger escapes from the bus.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle and a control method thereof configured for facilitating a passenger to be easily evacuated by opening a door when a vehicle estimates a collision with an obstacle in advance.

Additional aspects of the present invention will be set forth in part in the description which follows and, in part, will be obvious from the description, or may be learned by practice of the present invention.

In accordance with one aspect of the present invention, a vehicle may include: a vehicle detector configured to detect an obstacle and a condition of the inside and the outside of the vehicle; and a controller, when a front obstacle is detected by the vehicle detector, configured to determine a required braking distance or a time to collision (TTC) with respect to the obstacle, configured to determine whether a door side collision with the obstacle is estimated, when a collision with the obstacle is estimated according to the result of the determination, and configured to open a door in emergency or convert the door into a manual opening mode when the door side collision is estimated.

The controller may estimate the door side collision based on overlap information including at least one of a width direction overlap ratio between the vehicle and the obstacle, a width direction left and right free-overlap ratio between the vehicle and the obstacle or a lateral position corresponding to a position in a width direction of the vehicle with which a center of a width direction of the obstacle is in contact.

In a state in which a width of the obstacle exceeds a reference value, when a width direction overlap ratio between the vehicle and the obstacle exceeds a first reference percent (%) and when a door side free-overlap ratio with the obstacle with respect to the width direction of the vehicle is 0 (zero) %, the controller may be configured to determine that the door side collision occurs.

In a state in which a width of the obstacle is less than the reference value, when a width direction overlap ratio between the vehicle and the obstacle exceeds a second reference percent (%) and when a center of the width direction of the obstacle is in contact with a position exceeding 60% of the width direction of the vehicle, the controller may be configured to determine that the door side collision occurs.

The controller may be configured to determine the required braking distance through a formula 5,
wherein the formula 5 is $$D_{required} = \frac{V_{current}^2}{2a_{fullbrake}},$$

wherein $D_{required}$ represents a required braking distance, $V_{current}$ represents a current relative speed between the vehicle and the obstacle, and $a_{fullbrake}$ represents that a relative acceleration upon full braking≈deceleration of the vehicle upon maximum braking+acceleration of the obstacle.

When the door side collision is estimated, the controller may further determine whether all passengers wear a seat belt in the vehicle, or whether a standing passenger is present in the vehicle or not, by use of detection information related to the vehicle detector.

As a result of the determination, when all passengers wear a seat belt and when a standing passenger is not present in the vehicle, the controller may open the door in emergency.

As a result of the determination, when any passenger does not wear a seat belt and when a standing passenger is present in the vehicle, the controller may further determine whether the vehicle is stopped and whether the rollover of the vehicle occurs.

As a result of the determination, when the vehicle is stopped and when the rollover of the vehicle occurs, the controller may convert the door into a manual opening mode.

As a result of the determination, when the vehicle is stopped and when the rollover of the vehicle does not occur, the controller may open the door in emergency.

In accordance with one aspect of the present invention, a vehicle may include: a vehicle detector configured to detect an obstacle and a condition of the inside and the outside of the vehicle; and a controller, when a front obstacle is detected by the vehicle detector, configured to determine a required braking distance or a time to collision (TTC) with respect to the obstacle, configured to determine whether a driver seat side collision with the obstacle is estimated, when a collision with the obstacle is estimated according to the result of the determination, and configured to open a door in emergency when the driver seat side collision is estimated.

The controller may estimate the driver seat side collision based on overlap information including at least one of a width direction overlap ratio between the vehicle and the obstacle, a width direction left and right free-overlap ratio between the vehicle and the obstacle or a lateral position corresponding to a position in a width direction of the vehicle with which a center of a width direction of the obstacle is in contact.

In accordance with one aspect of the present invention, a vehicle control method may include: detecting a front obstacle by a vehicle detector; determining a required braking distance or a time to collision (TTC) with respect to the obstacle; determining whether a door side collision with the obstacle is estimated, when a collision with the obstacle is estimated according to the result of the determination; and opening a door in emergency or converting the door into a manual opening mode, when the door side collision is estimated according to the result of the determination.

The determination of whether a door side collision is estimated may perform by estimating the door side collision based on overlap information including at least one of a width direction overlap ratio between the vehicle and the obstacle, a width direction left and right free-overlap ratio between the vehicle and the obstacle or a lateral position corresponding to a position in a width direction of the vehicle with which a center of a width direction of the obstacle is in contact.

The determination of whether a door side collision is estimated may perform by determining that the door side collision occurs, in a state in which a width of the obstacle exceeds a reference value, when a width direction overlap ratio between the vehicle and the obstacle exceeds a first reference percent (%) and when a door side free-overlap ratio with the obstacle with respect to the width direction of the vehicle is 0 (zero) %.

The determination of whether a door side collision is estimated may perform by determining that the door side collision occurs in a state in which a width of the obstacle is less than the reference value, when a width direction overlap ratio between the vehicle and the obstacle exceeds a second reference percent (%) and when a center of the width direction of the obstacle is in contact with a position exceeding 60% of the width direction of the vehicle.

The determination of the required braking distance may perform through a formula 5, wherein the formula 5 is $$D_{required} = \frac{V_{current}^2}{2a_{fullbrake}}$$

wherein $D_{required}$ represents a required braking distance, $V_{current}$ represents a current relative speed between the vehicle and the obstacle, and $a_{fullbrake}$ represents that a relative acceleration upon full braking≈deceleration of the vehicle upon maximum braking+acceleration of the obstacle.

The open of the door in emergency or the conversion of the door into the manual opening mode may further include, when the door side collision is estimated, determining whether all passengers wear a seat belt in the vehicle, or whether a standing passenger is present in the vehicle or not, by use of detection information related to the vehicle detector.

The control method may include: as a result of the determination of whether all passengers wear a seat belt in the vehicle or whether a standing passenger is present in the vehicle, when all passengers wear a seat belt and when a standing passenger is not present in the vehicle, the emergency door opening is performed.

The control method may further include: as a result of the determination of whether all passengers wear a seat belt in the vehicle or whether a standing passenger is present in the vehicle, when any passenger does not wear a seat belt and when a standing passenger is present in the vehicle, determining whether the vehicle is stopped and whether the rollover of the vehicle occurs.

The control method may include: as a result of the determination of whether the vehicle is stopped and whether the rollover of the vehicle occurs, when the vehicle is stopped and when the rollover of the vehicle occurs, converting the door into a manual opening mode is performed.

The control method may include: as a result of the determination of whether the vehicle is stopped and whether the rollover of the vehicle occurs, when the vehicle is stopped and when the rollover of the vehicle does not occur, the emergency door opening is performed.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following description, like reference numerals refer to like elements throughout the specification. Well-known functions or constructions are not described more specifically since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it may be directly or indirectly connected to the other element, wherein the indirect connection may include "connection via a wireless communication network".

Also, when a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made more specifically to embodiments of the present invention, examples of which are illustrated in the accompanying drawings.

Figure 1:
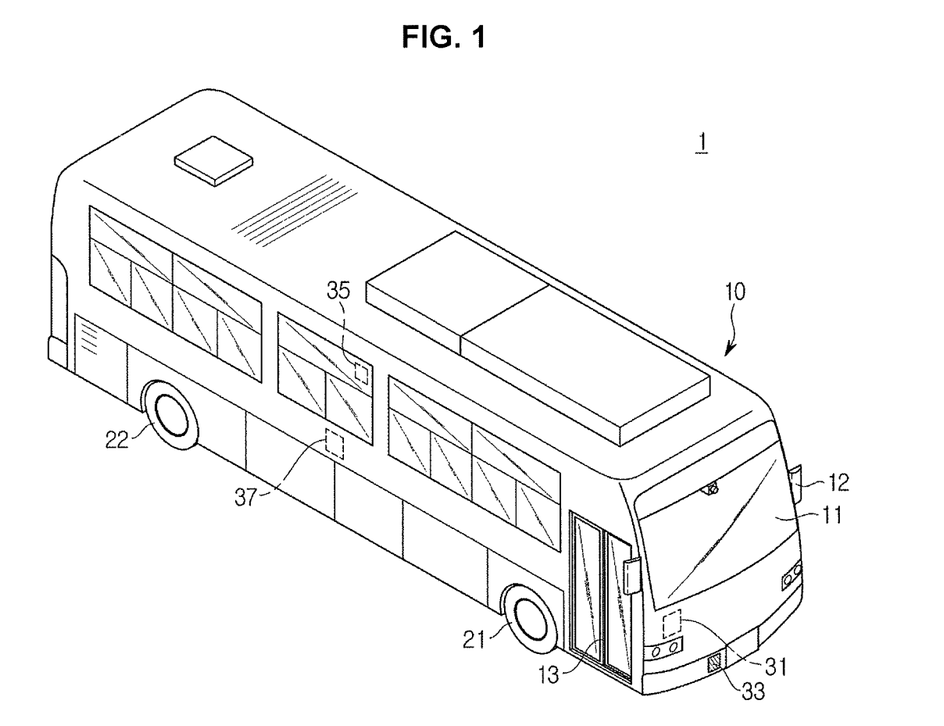
FIG. 1 is an external view illustrating a vehicle.

FIG. 1 is an external view illustrating a vehicle.

Referring to FIG. 1, an external of a vehicle 1 may include a body 10 forming an external of the vehicle 1, a windscreen 11 providing a front view of the vehicle 1 to a driver, a side mirror 12 providing a view of a rear side of the vehicle 1 to the driver, a door 13 closing the internal to the vehicle 1 from the outside, and vehicle wheels 21 and 22 moving the vehicle 1 by including a front wheel 21 disposed on a front side of the vehicle and a rear wheel 22 disposed on a rear side of the vehicle.

The windscreen 11 may be provided on an upper portion of the front of the body 10 to allow a driver within the vehicle 1 to acquire visual information related to the front of the vehicle 1. The side mirror 12 may include a left side mirror provided on the left side of the body 10 and a right side mirror provided on the right side of the body 10, and may allow a driver inside the vehicle 1 to acquire visual information related to the lateral side and the rear side of the vehicle 1.

The door 13 may be rotatably provided on a right side and a left side of the body 10. When the door 13 is opened, a driver may be allowed to be accommodated in the vehicle 1, and when the door 13 is closed, the internal to the vehicle 1 may be closed from the outside.

In addition to above mentioned components, the vehicle 1 may include a driving device configured to rotate the wheels 21 and 22, a steering system configured to change the driving direction of the vehicle 1, and a brake system configured to stop the driving of the wheels.

The driving device may supply a torque to the front wheel 21 or the rear wheel 22 so that the body 10 may be moved back and forth. The driving device may include an engine configured to generate a torque by burning the fossil or a motor configured to generate a torque by receiving the power from a battery The steering system may include a steering wheel receiving a driving direction from a driver, a steering gear changing a rotary motion of the steering wheel to a reciprocating motion, and a steering link delivering the reciprocating motion of the steering gear to the front wheel 21. Accordingly, the steering system may change the driving direction of the vehicle 1 by changing the direction of the rotary axis of the wheels.

The brake system may include a brake pedal receiving a brake operation from a driver, a brake drum coupled to the wheels 21 and 22, and a brake shoe stopping the rotation of the brake drum by use of friction force. Accordingly, the brake system may stop the driving of the vehicle 1 by stopping the rotation of the wheels 21 and 22.

Referring to FIG. 1, according to an exemplary embodiment of the present invention, an image acquisition device 31 including a camera, a radar 33, a passenger detector 35, and an rollover detector 37 are mounted to determine a collision between an obstacle and a side of door. A mounting position of the above mentioned detector is not limited to that shown in FIG. 1. Alternatively, the position of the detector may vary according to a detector configured to acquire information to estimate a collision between a vehicle and an obstacle.

Figure 2:
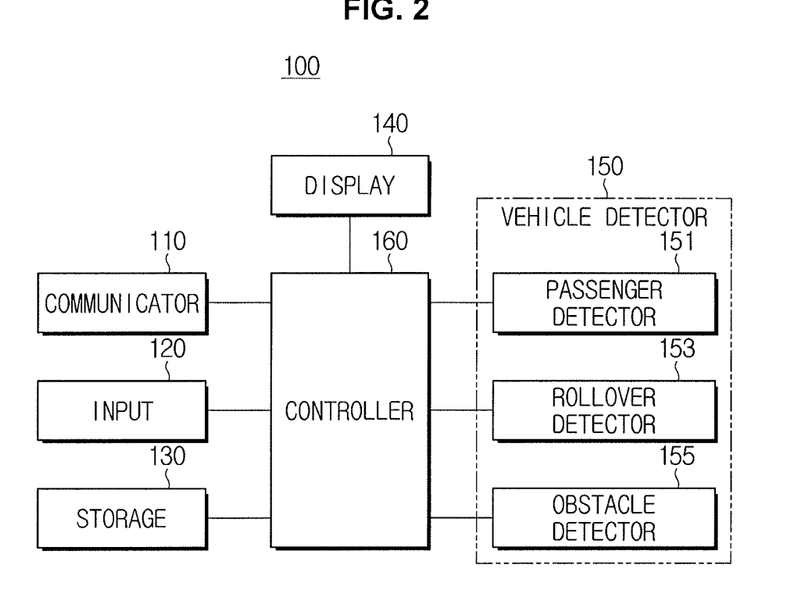
FIG. 2 is a control block diagram illustrating a configuration of the vehicle in detail.

FIG. 2 is a control block diagram illustrating a configuration of the vehicle more specifically.

Figure 3:
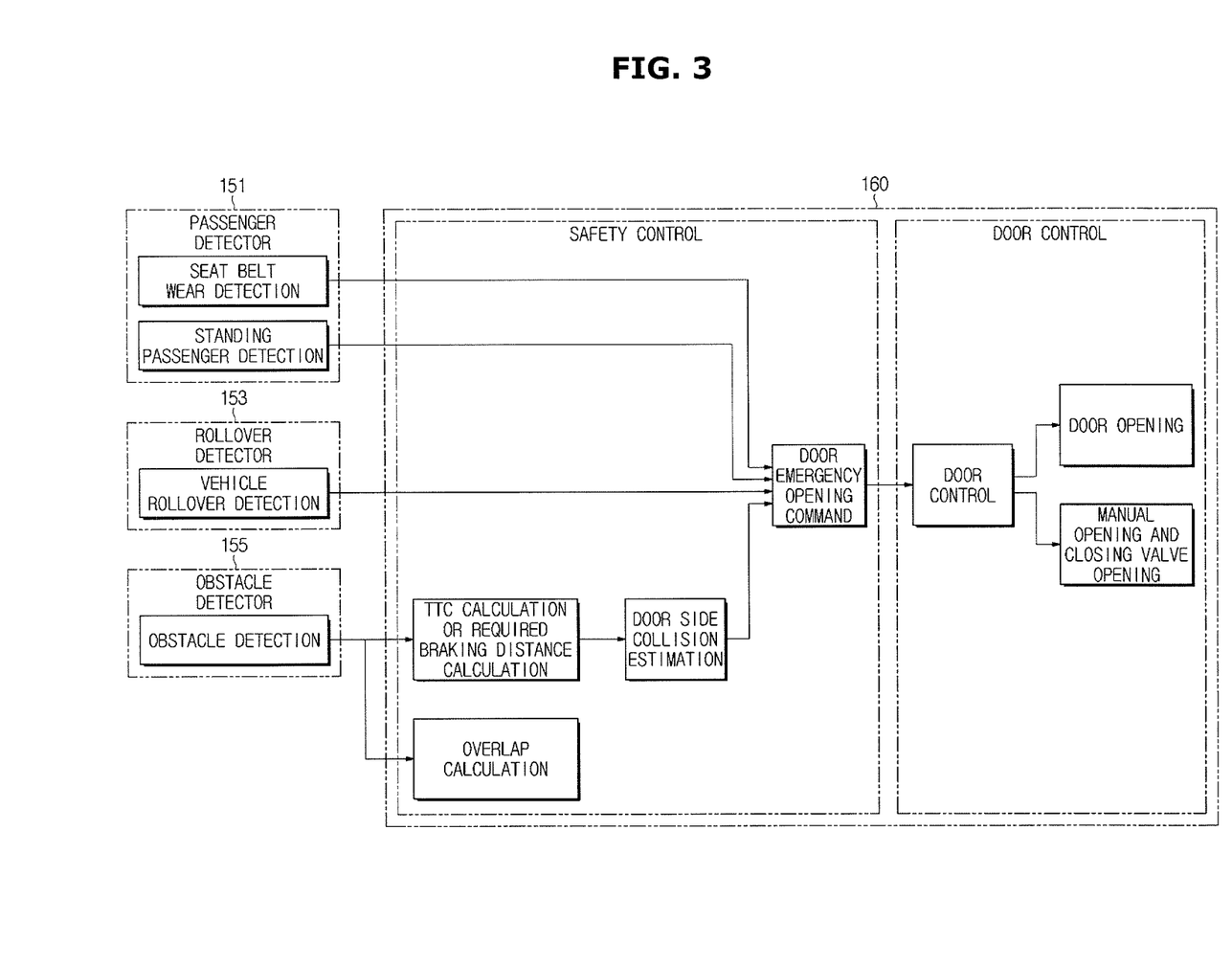
FIG. 3 is a control block illustrating a door control method.
Figure 4:
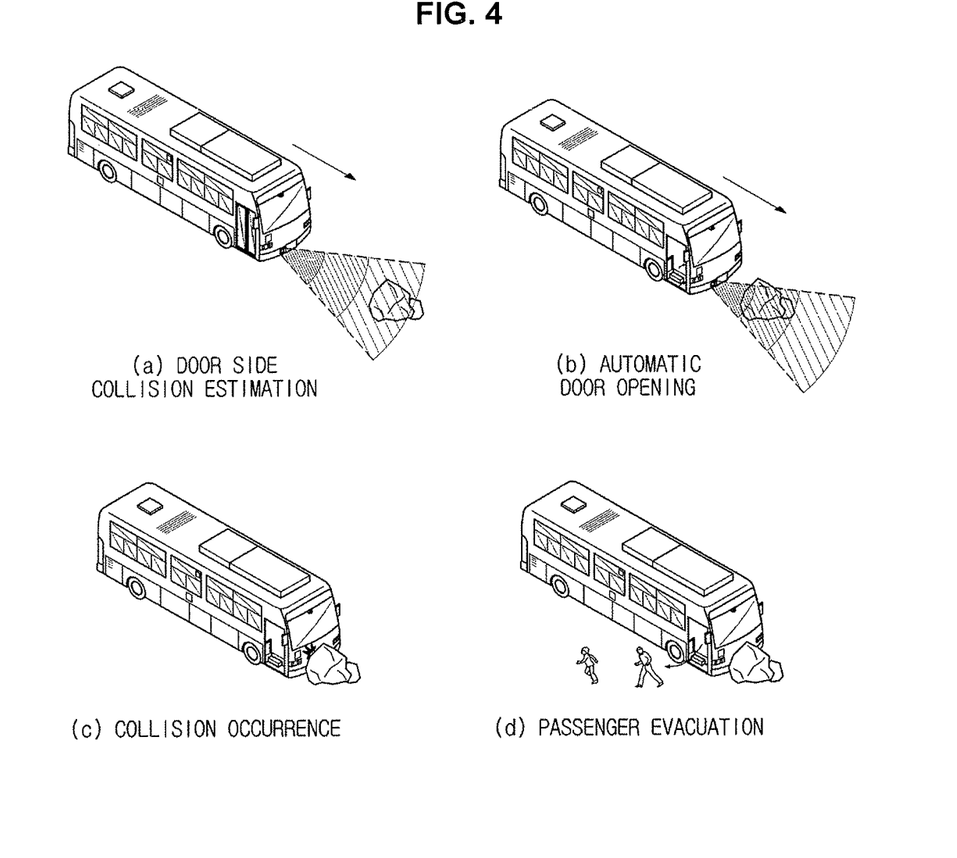
FIG. 4 is an exemplary view illustrating a door control process.
Figure 5:
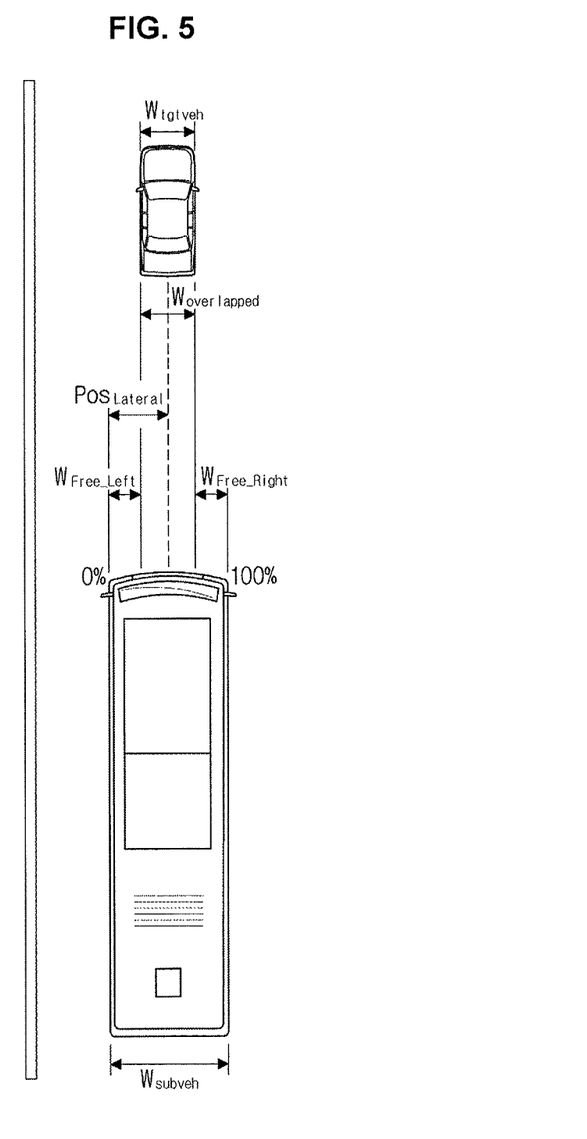
FIG. 5, FIG. 6 and FIG. 7 are views illustrating a method for determining a door side collision.
Figure 6:
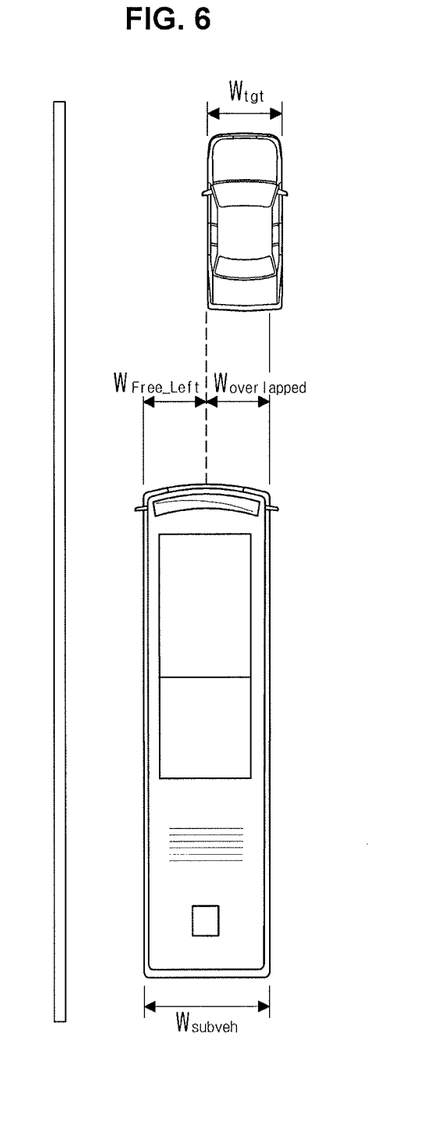
Figure 7:
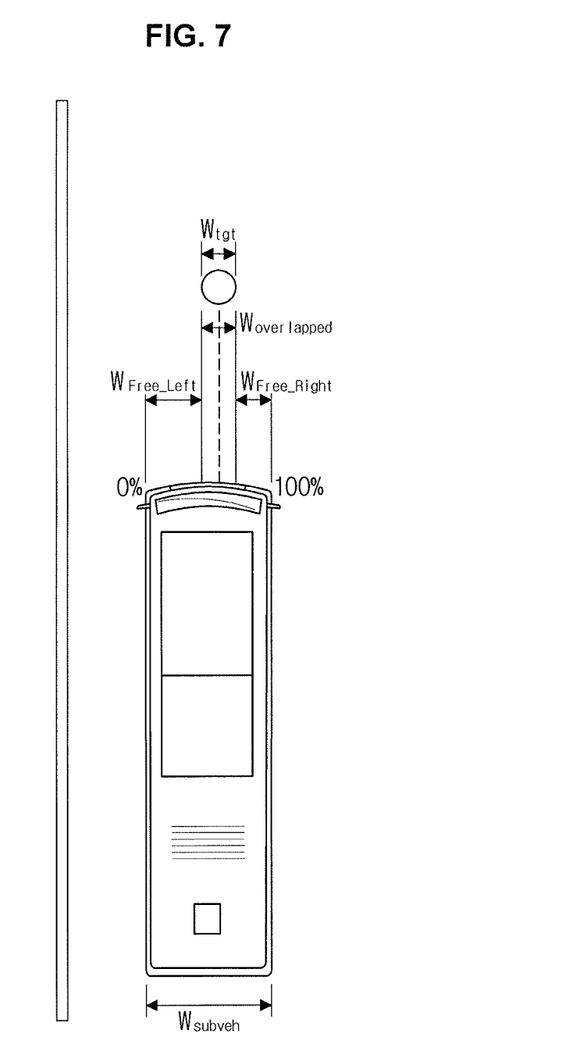

FIG. 3 is a control block illustrating a door control method, FIG. 4 is an exemplary view illustrating a door control process, and FIG. 5, FIG. 6 and FIG. 7 are views illustrating a method for determining a door side collision.

Hereinafter a description will be described with reference to FIGS. 3 to 7.

Referring to FIG. 2, the vehicle 100 may include a communicator 110, an input 120, a storage 130, a display 140, a vehicle detector 150, and a controller 160.

The communicator 110 may include one or more components configured to allow the communication with an external device, wherein the communicator may include at least one of a short range communication module, a wired communication module, and a wireless communication module.

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module may include a variety of wired communication module, e.g., Controller Area Network (CAN) communication module, Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard232 (RS-232), or plain old telephone service (POTS).

The wireless communication module may include a wireless communication module supporting a variety of wireless communication methods, e.g., Radio Data System-Traffic Message Channel (RDS-TMC), Digital Multimedia Broadcasting (DMB), Wifi module, Wireless broadband module, global System for Mobile (GSM) Communication, Code Division Multiple Access (CDMA), Wideband Code Division Multiple Access (WCDMA), Time Division Multiple Access (TDMA), and Long Term Evolution (LTE).

The wireless communication module may include a wireless communication interface having an antenna and a receiver that receive traffic information signals. Furthermore, the wireless communication module may further include a traffic information signal conversion module for demodulating an analogy wireless signal received via the wireless communication interface, into a digital control signal The communicator 110 may further include an internal communication module for the communication among the electronic devices in the vehicle 100. The internal communication protocol of the vehicle 100 may include Controller Area Network (CAN), Local Interconnection Network (LIN), FlexRay, or Ethernet.

The input 120 may include hardware type devices, e.g., a variety of buttons, switches, pedals, keyboards, mouse, track-balls, a variety levers, handles and sticks, for the input by a user.

The input 120 may include software type devices, e.g., Graphical User interface (GUI) including a touch pad for the input by a user. The touch pad may be implemented by Touch Screen Panel (TSP) and thus the touch pad may have a layer structure with the display 140.

The storage 130 may store a variety of information related to the vehicle 100 including a variety of standards to determine a collision between a door and an obstacle, a door emergency opening, and a door manual opening mode conversion.

The storage 130 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage is not limited thereto. The storage 130 may be a memory which is implemented by a separate memory chip from the aforementioned processor related to the controller 160 or the storage may be implemented by a single chip with a processor.

The display 140 may display a variety of control information, which is implemented in the vehicle 100 including a risk warning about a collision with a front obstacle, a door collision risk warning, a door emergency opening, and a door manual opening mode, so that a user checks the information.

The display 140 may be implemented by Cathode Ray Tube (CRT), Digital Light Processing (DLP) panel, Plasma Display Penal, Liquid Crystal Display (LCD) panel, Electro Luminescence (EL) panel, Electrophoretic Display (EPD) panel, Electrochromic Display (ECD) panel, Light Emitting Diode (LED) panel or Organic Light Emitting Diode (OLED) panel. The implementation of the display is not limited thereto.

The vehicle detector 150 may be a configuration configured to detect the condition of the inside and outside of the vehicle including an obstacle.

The vehicle detector 150 may include a passenger detector 151 configured to detect a passenger located in the vehicle 100, a rollover detector 153 configured to detect whether the rollover of the vehicle 100 occurs, and an obstacle detector 155 configured to detect an obstacle placed in front.

The passenger detector 151 may be implemented by an image acquirer including a camera, an ultrasonic detector or a laser detector. It is understood that the passenger detector 151 is not limited to the above-described sensors, but may be replaced or added with other detectors configured for detecting passengers.

The passenger detector 151 may determine whether a standing passenger is present and whether a passenger wears a seat belt or not.

The rollover detector 153 may be implemented by a gyro detector, or a lateral acceleration detector. The rollover detector 153 is not limited to the above-described sensors, but may be replaced or added with other detectors configured for detecting whether the rollover of the vehicle 100 occurs.

The obstacle detector 155 may be configured to detect obstacles including other vehicles located in front of the vehicle 100, and may be implemented by a radar or an image acquirer.

The obstacle detector 155 may detect an obstacle and determine a longitudinal/lateral position, a relative speed, and a relative acceleration of the obstacle.

When detecting a front obstacle via the vehicle detector 150, the controller 160 may determine a required braking distance or a time to collision (TTC) about the obstacle, and when a collision with the obstacle is estimated according to a result of the determination, the controller 160 may determine whether a door side collision with the obstacle is estimated. When the door side collision is estimated, the controller 160 may open the door in emergency or convert a mode to a manual opening mode.

Referring to FIG. 3, the controller 160 may perform the detection of the seat belt and the detection of standing passenger, via the passenger detector 151, and may detect the rollover of the vehicle, via the rollover detector 153. The controller 160 may detect a front obstacle by the obstacle detector 155, determine a time to collision (TTC) with the obstacle or determine a required braking distance, determine an overlap by use of a lateral position of the obstacle and a width of the obstacle, and then estimate a door side collision with the obstacle. Based on information detected by the vehicle detector 150 or information determined by the information detected by the vehicle detector 150, the controller 160 may command an emergency door opening, and according to conditions, automatically open the door in emergency or convert the door into the manual opening mode by opening a manual opening and closing valve.

Referring to FIG. 4, the controller 160 may estimate the door side collision (a) based on the information detected by the vehicle detector 150, and automatically open the door in emergency (b) when the door side collision is estimated. When the vehicle is stopped after the collision occurs (c), the passenger may be evacuated (d).

The controller 160 may estimate the door side collision based on overlap information including at least one of a width direction overlap ratio between the vehicle 100 and an obstacle, a width direction left and right free-overlap ratio between the vehicle 100 and the obstacle or a lateral position corresponding to a position in a width direction of the vehicle with which a center of a width direction of the obstacle is in contact.

Referring to FIG. 5, a width direction overlap ratio (overlap (%)) between a subject vehicle (subveh) and a target vehicle (tgtveh) corresponding to the obstacle may be expressed by a formula 1, a width direction right side free-overlap ratio (free_right (%)) between the vehicle and the obstacle may be expressed by a formula 2, a width direction left side free-overlap ratio (free_left (%)) between the vehicle and the obstacle may be expressed by a formula 3, and a lateral position (lateral_position (%)) in which a center of a width direction of the obstacle is in contact with a width direction of the vehicle may be expressed by a formula 4.

Overlap (%)=$W_{overlap}/W_{subveh}*100$ [Formula 1]

Free_Right (%)=$W_{Free\_Right}/W_{subveh}*100$ [Formula 2]

Free_Left (%)=$W_{Free\_Left}/W_{subveh}*100$ [Formula 3]

Lateral_Position (%)=$Pos_{Lateral}/W_{subveh}*100$ [Formula 4]

In a state in which the width of the obstacle exceeds a reference value, when a width direction overlap ratio between the vehicle 100 and the obstacle exceeds a first reference percent (%) and when a door side free-overlap ratio with the obstacle with respect to the width direction of the vehicle is 0 (zero) %, the controller 160 may determine that a door side collision occurs. In the present time, as for a door side collision determination reference, in a state in which a width of a wide obstacle is equal to or greater than a reference, e.g., 0.5 m, a first reference percent may be 15% and a door side free-overlap ratio may be 0 (zero) %, but is not limited thereto. For example, a wide obstacle may be a vehicle and a wall.

Referring to FIG. 6, when a width of an obstacle ($W_{tgt}$) is equal or greater than 0.5 m, an overlap ratio is 50%, $W_{Free\_Right}$ is 0 (zero) %, and $W_{Free\_Left}$ is 50%, the controller 160 may determine that the door side collision occurs since references including an overlap ratio >15%, and $W_{Free\_Right}$=0% are satisfied.

In a state in which the width of the obstacle is less than the reference value, when a width direction overlap ratio between the vehicle 100 and the obstacle exceeds a second reference percent (%) and when a center of the obstacle in the width direction is in contact with a position exceeding 60% of the width direction of the vehicle, the controller 160 may determine that the door side collision occurs. In the present time, as for a door side collision determination reference, in a state in which a width of a narrow obstacle is less than a reference, e.g., 0.5 m, a second reference percent may be 1% and the center of the obstacle in the width direction may exceed 60% of the width direction of the vehicle, but is not limited thereto. For example, a narrow obstacle may be a telephone pole, and a street tree.

Referring to FIG. 7, when a width of an obstacle ($W_{tgt}$) is less than 0.5 m, an overlap ratio is 50%, $W_{Free\_Right}$ is 25%, $W_{Free\_Left}$ is 55%, and $Pos_{Lat}$ is 67.5%, the controller 160 may determine that the door side collision occurs since references including an overlap ratio >1%, and $Pos_{Lat}$>60% are satisfied.

The controller 160 may determine a required braking distance through a formula 5.

$$D_{required} = \frac{V_{current}^2}{2a_{fullbrake}}$$ [Formula 5]

$D_{required}$ may represent a required braking distance, $V_{current}$ may represent a current relative speed between a vehicle and an obstacle, and $a_{fullbrake}$ may represent that a relative acceleration upon full braking≈deceleration of the vehicle upon maximum braking+acceleration of the obstacle.

When the door side collision is estimated, the controller 160 may further include determining whether all passengers wear a seat belt in the vehicle, or determining whether a standing passenger is present in the vehicle or not, by use of detection information related to the vehicle detector 150.

As a result of the determination, when all passengers wear a seat belt and when a standing passenger is not present in the vehicle, the controller 160 may open the door in emergency.

As a result of the determination, when any passenger does not wear a seat belt and when a standing passenger is present in the vehicle 100, the controller 160 may further include determining whether the vehicle is stopped and whether the rollover of the vehicle occurs.

As a result of the determination, when the vehicle 100 is stopped and when the rollover of the vehicle occurs, the controller 160 may convert the door into the manual opening mode.

As a result of the determination, when the vehicle 100 is stopped and when the rollover of the vehicle does not occur, the controller 160 may open the door in emergency.

When a front obstacle is detected via the vehicle detector 150, the controller 160 may determine a required braking distance or a time to collision (TTC) about an obstacle. When the collision with the obstacle is estimated according to a result of the determination, the controller 160 may determine whether a collision between the obstacle and a driver seat side is estimated or not, and when the collision is estimated, the controller 160 may open the door in emergency.

The door emergency opening according to the estimation of the driver seat side collision may represent opening the door automatically, since it is concerned that a driver is injured due to the driver seat side collision and it is difficult for the driver to open the door to help passenger for evacuation.

The controller 160 may estimate the driver seat side collision based on overlap information including at least one of a width direction overlap ratio between the vehicle 100 and an obstacle, a width direction left and right free-overlap ratio between the vehicle 100 and the obstacle or a lateral position corresponding to a position in a width direction of the vehicle with which a center of a width direction of the obstacle is in contact.

It is understood that the above-described door side collision estimation method may be applied to the driver side collision estimation method.

The controller 160 may be implemented using a memory storing an algorithm for controlling an operation of components in the vehicle 100 and data related to programs implementing the algorithm, and a processor or performing the above mentioned operation using the data stored in the memory. The memory and the processor may be implemented in separate chips, or a single chip.

Figure 8:
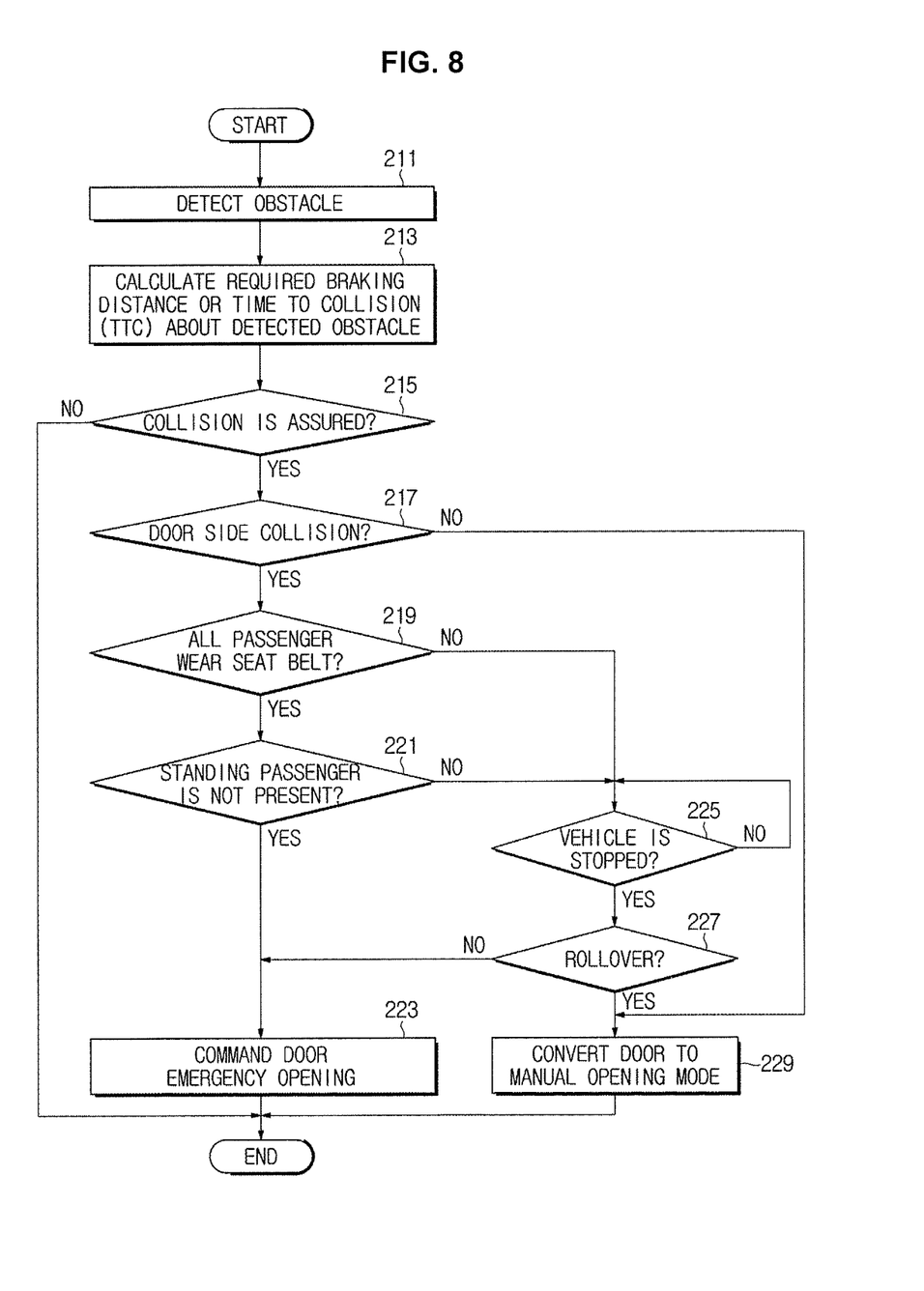
FIG. 8 is a flowchart illustrating a control method of a vehicle.

FIG. 8 is a flowchart illustrating a control method of a vehicle.

First, the vehicle 100 may detect obstacles in front by the vehicle detectors 150 (211).

Next, the vehicle 100 may determine the required braking distance or the time to collision time (TTC) about the obstacle (213).

The vehicle 100 may determine the required braking distance through the formula 5.

When the collision with the obstacle is estimated (215) according to a result of the determination of the step 213, the vehicle 100 may determine whether a collision between the obstacle and the door side is estimated (217).

At the step 215, when a relative distance with the obstacle is less than (a required braking distance*70%), the vehicle 100 may determine that the collision is estimated since the collision is assured.

At the step 217, the vehicle 100 may estimate the door side collision, based on the overlap information including at least one of a width direction overlap ratio between the vehicle 100 and an obstacle, a width direction left and right free-overlap ratio between the vehicle 100 and the obstacle or a lateral position corresponding to a position in a width direction of the vehicle with which a center of a width direction of the obstacle is in contact.

In a state in which the width of the obstacle exceeds a reference value, when a width direction overlap ratio between the vehicle 100 and the obstacle exceeds the first reference percent (%) and when a door side free-overlap ratio with the obstacle with respect to the width direction of the vehicle is 0 (zero) %, the vehicle 100 may determine that the door side collision occurs.

In a state in which the width of the obstacle is less than the reference value, when a width direction overlap ratio between the vehicle 100 and the obstacle exceeds a second reference percent (%) and when a center of the obstacle is in contact with a position exceeding 60% of the width direction of the vehicle, the vehicle 100 may determine that the door side collision occurs.

As a result of the step 217, when the door side collision is estimated, the vehicle 100 may perform a process of opening the door in emergency or converting the mode into the manual opening mode (219~229), described later.

When the door side collision is estimated, the vehicle 100 may determine whether all passengers wear a seat belt in the vehicle, or whether a standing passenger is present in the vehicle or not, by use of detection information related to the vehicle detector 150 (219 and 221).

As a result of the determination of whether all passengers wear a seat belt in the vehicle 100, or whether a standing passenger is present in the vehicle 100, when all passengers wear a seat belt and when a standing passenger is not present in the vehicle 100, the vehicle 100 may open the door 13 (refer to FIG. 1) in emergency (223).

Meanwhile, as a result of the determination of whether all passengers wear a seat belt in the vehicle or whether a standing passenger is present in the vehicle, when any standing passenger does not wear a seat belt and when a standing passenger is present in the vehicle, the vehicle 100 may determine whether the vehicle is stopped and whether the rollover of the vehicle occurs (225 and 227).

In the present time, the vehicle 100 may determine that the vehicle is stopped when a vehicle speed is less than a reference speed, a longitudinal acceleration change amount is less than a reference longitudinal acceleration change amount, and a yaw rate change rate is less than a reference yaw rate change rate, during a predetermined time period.

For example, when the vehicle speed is less than 1 km/h, the longitudinal acceleration change amount is less than 0.01 m/s2, the yaw rate change rate is less than 0.01 rad/s, the vehicle 100 may determine that the vehicle is stopped.

As a result of determination of whether the vehicle is stopped and whether the rollover of the vehicle 100 occurs, when the vehicle is stopped and when the rollover of the vehicle 100 occurs, the vehicle 100 may convert the door 13 (refer to FIG. 1) to the manual opening mode (229). In the present time, converting the door into the manual opening mode may represent a state in which a user is enable to manually open the door after releasing the pressure by opening the manual opening and closing valve of the door.

As a result of determination of whether the vehicle is stopped and whether the rollover of the vehicle 100 occurs, when the vehicle is stopped and when the rollover of the vehicle 100 does not occur, the vehicle 100 may open the door 13 (refer to FIG. 1) in emergency.

As is apparent from the above description, when the vehicle estimates the collision with an obstacle in advance, it may be possible to allow passengers to be easily evacuated by preemptively opening a door upon the collision.

It may be possible to safely evacuate passengers because the window glass does not need to be broken at the collision between the vehicle and the obstacle.

Since the vehicle automatically opens the door only in a collision case in which the door may be damaged, it may be possible to prevent a case in which the safety of the passenger is threatened due to the unnecessary automatic opening of the door when the vehicle is not stopped or the rollover of the vehicle occurs.

It may be possible to convert the door into the manual opening mode in a case in which it is determined that the automatic opening of the door is dangerous, so that the door may be opened according to the judgment of the passenger, facilitating the evacuation of the passenger.

The disclosed exemplary embodiments may be implemented as a recording medium storing a command executable by a computer. The command may be stored in the program code type. When executed by the processor, a program module may be generated and perform the disclosed exemplary embodiments. The recording medium may be implemented as a computer readable recording medium.

The disclosed exemplary embodiments may be implemented as a computer code on a computer readable recording medium. The computer readable recording medium may include various kinds of recording medium stored data decrypted by the computer system. For example, there may be a Read Only Memory (ROM), a Random Access Memory (RAM), a magnetic tape, a magnetic disk, a flash memory, and an optical data storage device For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle having a body and a door coupled to the body, the vehicle comprising:
a vehicle detector configured to detect an obstacle and a condition of an inside and an outside of the vehicle; and
a controller, when the obstacle is detected by the vehicle detector, configured to determine a required braking distance or a time to collision (TTC) with respect to the obstacle, configured to determine whether a door side collision with the obstacle is estimated, when a collision with the obstacle is estimated according to a result of the determination, and configured to open the door or convert the door into a manual opening mode when the door side collision is estimated,
wherein the controller is configured to estimate the door side collision based on overlap information including a width direction overlap ratio between the body of the vehicle and the obstacle, and a width direction left and right free-overlap ratio between the body of the vehicle and the obstacle.

2. The vehicle of claim 1, wherein
the controller is configured to determine the required braking distance through a formula 5,
wherein the formula 5 is $$D_{required} = \frac{V_{current}^2}{2a_{fullbrake}},$$

wherein $D_{required}$ is a required braking distance, $V_{current}$ is a current relative speed between the vehicle and the obstacle, and $a_{fullbrake}$ is a relative acceleration upon full braking.

3. The vehicle of claim 1, wherein
in a state in which a width of the obstacle exceeds a reference value, when the width direction overlap ratio between the vehicle and the obstacle exceeds a first reference percent (%) and when a door side free-overlap ratio with the obstacle with respect to the width direction of the vehicle is 0 (zero) %, the controller is configured to determine that the door side collision occurs.

4. The vehicle of claim 3, wherein
in a state in which a width of the obstacle is less than the reference value, when the width direction overlap ratio between the vehicle and the obstacle exceeds a second reference percent (%) and when a center of the width direction of the obstacle is in contact with a position more than 60% of the width direction of the vehicle, the controller is configured to determine that the door side collision occurs.

5. The vehicle of claim 1, wherein
when the door side collision is estimated, the controller is configured to further determine whether all passengers are wearing a seat belt in the vehicle, or whether a standing passenger is present in the vehicle, by use of detection information related to the vehicle detector.

6. The vehicle of claim 5, wherein
as a result of the determination, when all of the passengers are wearing the seat belt and when the standing passenger is not present in the vehicle, the controller is configured to open the door.

7. The vehicle of claim 5, wherein
as a result of the determination, when at least one of the passengers do not wear the seat belt and when the standing passenger is present in the vehicle, the controller is configured to further determine whether the vehicle is stopped and whether a rollover of the vehicle occurs.

8. The vehicle of claim 7, wherein
as a result of the determination, when the vehicle is stopped and when the rollover of the vehicle occurs, the controller is configured to convert the door into a manual opening mode.

9. The vehicle of claim 7, wherein
as a result of the determination, when the vehicle is stopped and when the rollover of the vehicle does not occur, the controller is configured to unlock the door.

10. A vehicle having a body and a door coupled to the body, the vehicle comprising:
a vehicle detector configured to detect an obstacle and a condition of an inside and an outside of the vehicle; and
a controller, when the obstacle is detected by the vehicle detector, configured to determine a required braking distance or a time to collision (TTC) with respect to the obstacle, configured to determine whether a driver seat side collision with the obstacle is estimated, when a collision with the obstacle is estimated according to a result of the determination, and configured to open the door when the driver seat side collision is estimated,
wherein the controller is configured to estimate the driver seat side collision based on overlap information including at least one of a width direction overlap ratio between the body of the vehicle and the obstacle, and a width direction left and right free-overlap ratio between the body of the vehicle and the obstacle.

11. A control method of a vehicle having a body and a door coupled to the body, the control method comprising:
detecting an obstacle by a vehicle sensor;
determining a required braking distance or a time to collision (TTC) with respect to the obstacle;
determining whether a door side collision with the obstacle is estimated, when a collision with the obstacle is estimated according to a result of the determination; and
opening the door in emergency or converting the door into a manual opening mode, when the door side collision is estimated according to a result of the determination,
wherein the determination of whether the door side collision is estimated is performed by estimating the door side collision based on overlap information including at least one of a width direction overlap ratio between the body of the vehicle and the obstacle, and a width direction left and right free-overlap ratio between the body of the vehicle and the obstacle.

12. The control method of claim 11, wherein
the determination of the required braking distance is performed through a formula 5,
wherein the formula 5 is $$D_{required} = \frac{V_{current}^2}{2a_{fullbrake}}$$

wherein $D_{required}$ is a required braking distance, $V_{current}$ is a current relative speed between the vehicle and the obstacle, and $a_{fullbrake}$ is a relative acceleration upon full braking.

13. The control method of claim 11, wherein
the determination of whether the door side collision is estimated is performed by determining that the door side collision occurs, in a state in which a width of the obstacle exceeds a reference value, when the width direction overlap ratio between the vehicle and the obstacle exceeds a first reference percent (%) and when a door side free-overlap ratio with the obstacle with respect to the width direction of the vehicle is 0 (zero) %.

14. The control method of claim 13, wherein
the determination of whether the door side collision is estimated is performed by determining that the door side collision occurs in a state in which a width of the obstacle is less than the reference value, when a width direction overlap ratio between the vehicle and the obstacle exceeds a second reference percent (%) and when the center of the width direction of the obstacle is in contact with a position more than 60% of the width direction of the vehicle.

15. The control method of claim 11, wherein
the opening of the door in emergency or the conversion of the door into the manual opening mode further includes, when the door side collision is estimated, determining whether all passengers are wearing a seat belt in the vehicle, or whether a standing passenger is present in the vehicle, by use of detection information related to the vehicle detector.

16. The control method of claim 15, wherein
as a result of the determination of whether all the passengers are wearing the seat belt in the vehicle or whether the standing passenger is present in the vehicle, when all the passengers are wearing the seat belt and when the standing passenger is not present in the vehicle, the emergency door opening is performed.

17. The control method of claim 15, further including:
as a result of the determination of whether all the passengers are wearing the seat belt in the vehicle or whether the standing passenger is present in the vehicle, when all the passenger do not wear the seat belt and when the standing passenger is present in the vehicle, determining whether the vehicle is stopped and whether a rollover of the vehicle occurs.

18. The control method of claim 17, wherein
as a result of the determination of whether the vehicle is stopped and whether the rollover of the vehicle occurs, when the vehicle is stopped and when the rollover of the vehicle occurs, converting the door into a manual opening mode is performed.

19. The control method of claim 17, wherein
as a result of the determination of whether the vehicle is stopped and whether the rollover of the vehicle occurs, when the vehicle is stopped and when the rollover of the vehicle does not occur, the emergency door opening is performed.

* * * * *